United States Patent
Plekkenpol et al.

(10) Patent No.: US 7,624,706 B1
(45) Date of Patent: Dec. 1, 2009

(54) ANIMAL SORTING PADDLE HAVING A PADDLE HEAD WITH AN ANGLED TIP

(75) Inventors: Wayne A. Plekkenpol, Belle Plaine, MN (US); Jerry J. Zien, Prior Lake, MN (US)

(73) Assignee: Miller Manufacturing Company, Inc., Eagan, MN (US)

( * ) Notice: Subject to any disclaimer, the term of this patent is extended or adjusted under 35 U.S.C. 154(b) by 10 days.

(21) Appl. No.: 11/334,612

(22) Filed: Jan. 18, 2006

(51) Int. Cl.
*A01K 29/00* (2006.01)
(52) U.S. Cl. .................................. 119/840
(58) Field of Classification Search ............ 119/840, 119/841, 801, 719, 905, 908, 174; 446/419, 446/421; 473/234; 231/7; 84/418; 116/170; 440/101, 102
See application file for complete search history.

(56) References Cited

U.S. PATENT DOCUMENTS

| | | | | |
|---|---|---|---|---|
| 4,701,142 A | * | 10/1987 | Merritt | 440/101 |
| 5,074,554 A | * | 12/1991 | Ramon, Jr. | 473/525 |
| 5,738,560 A | * | 4/1998 | Bears | 446/220 |
| 6,055,940 A | | 5/2000 | Koehn | |

\* cited by examiner

*Primary Examiner*—Yvonne R. Abbott
(74) *Attorney, Agent, or Firm*—James W. Miller

(57) ABSTRACT

An animal sorting paddle comprises a handle having a paddle head attached to a lower end thereof. The tip of the paddle head can be positioned adjacent a corner formed by the ground and by a substantially vertical wall of a pen, stall or chute when the user holds the handle at an upper end of the handle at an angle relative to the ground. The tip of the paddle head has a pointed, arrowhead shape so that the sides of the arrowhead shape are generally adjacent the ground and the wall of the pen, stall or chute when the tip of the paddle head is adjacent the corner. This pre-vents small animals from squeezing beneath the paddle head. The paddle head can be reversibly mounted to the handle to allow either the pointed, arrowhead shaped tip to be used or a flat, straight tip formed on the other end of the paddle head.

15 Claims, 5 Drawing Sheets

ANIMAL SORTING PADDLE HAVING A PADDLE HEAD WITH AN ANGLED TIP

TECHNICAL FIELD

This invention relates to any field, such as farming or animal husbandry, that involves the handling of livestock. More particularly, this invention relates to an animal sorting paddle used to control the movement of live-stock or to separate livestock from one another.

BACKGROUND OF THE INVENTION

In the handling of livestock, it is often necessary to control the movement of livestock in a pen, stall or chute. For example, when pigs are being moved, it might be necessary to prevent the passage of piglets but to allow the passage of mature pigs. This might done when mature pigs are being readied or loaded for transport to market. Or, one might wish to block the free passage of piglets around a pen or stall to stop the piglets from moving to allow them to be more easily picked up and handled.

A sorting paddle is a known implement that has been developed for use in accomplishing the above noted animal control and separating objectives. A typical sorting paddle comprises a long handle having an enlarged paddle head at one end. A user who is standing holds the handle and can position the paddle head adjacent the ground.

The user can insert the paddle head anywhere the user likes. For example, the user can insert the paddle head into a group of animals or can place the paddle head next to a single animal. The exact method of use depends upon the situation and the user's needs. The paddle head will block the passage of an animal within a pen, stall or chute. This allows the user to control the movement of a particular animal or to separate a particular animal from others.

The paddle head is usually made from a substantially rigid plastic and the paddle head is often hollow. Noise producing members, such as BB's, are often placed inside the hollow paddle head. These noise producing members will rattle and produce a noise as the paddle head is shaken or moved by the user. This noise also has an affect on the animal and can further help controls its movement.

However, sorting paddles are often not as effective on young or small animals as they are on older or mature animals of a particular species. This is particularly true for pigs. For example, piglets are very adept at squeezing through the types of gaps presented between the ground and the underside of conventionally shaped paddle heads on animal sorting paddles. Thus, there is a need in the art for a sorting paddle that can effectively block the passage of relatively young and/or small animals that have short legs, such as piglets.

SUMMARY OF THE INVENTION

One aspect of this invention relates to an animal sorting paddle for use in controlling the movement of animals. The paddle comprises an elongated handle having a paddle head attached to a lower end thereof. The handle is long enough so that a standing user who is holding the handle at an angle relative to the ground can position a tip of the paddle head adjacent the ground. The tip of the paddle head is angled and comprises a pair of straight sides disposed at an angle relative to a centerline of the paddle head. The angle is chosen such that one side of the tip lies substantially adjacent the ground and the other side of the tip lies substantially adjacent the wall of a pen, stall or chute when the tip of the paddle head is placed adjacent a corner between the ground and a substantially vertical wall of a pen, stall or chute. Thus, the movement of small animals beneath the angled tip of the paddle head is substantially blocked.

Another aspect of this invention relates to an animal sorting paddle for use in controlling the movement of animals. The paddle comprises an elongated handle having a paddle head attached to a lower end thereof. The handle is long enough so that a standing user who is holding the handle at an angle relative to the ground can position a tip of the paddle head adjacent the ground. The paddle head has a pointed, arrowhead shaped tip.

Yet another aspect of this invention relates to an animal sorting paddle for use in controlling the movement of animals. The paddle comprises an elongated handle having a paddle head attached to a lower end thereof, the handle is long enough so that a standing user can position the paddle head adjacent the ground. The paddle head has a front end and a rear end. The paddle head is reversibly installable on the handle such that either the front end or the rear end forms a tip of the paddle head. The front end and the rear end of the paddle head are shaped differently from one another to provide different animal movement controlling effects depending upon whether the front end or the rear end is used as the tip of the paddle head.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
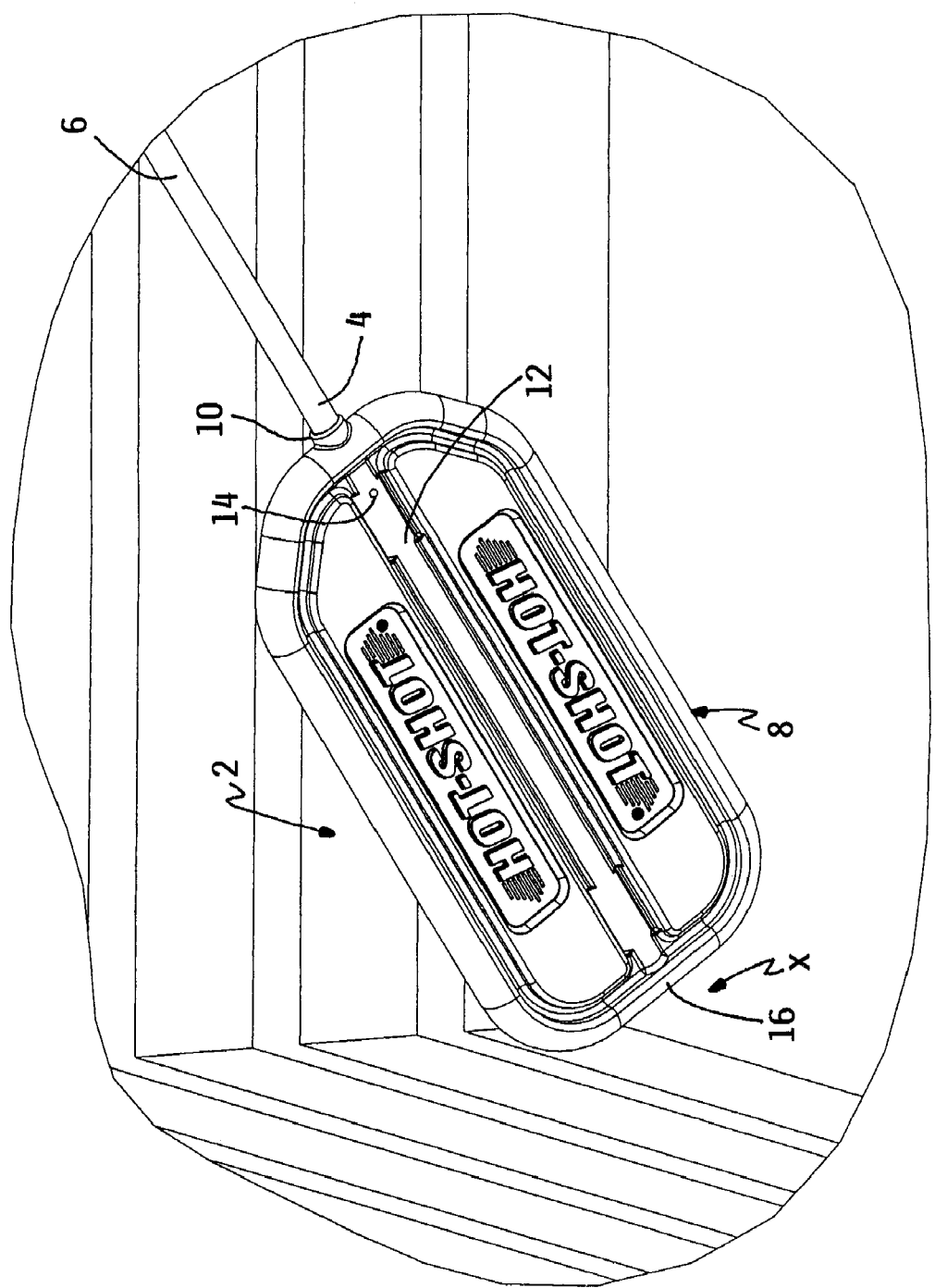
FIG. 1 is a perspective view of a conventional sorting paddle, particularly illustrating the paddle head adjacent the ground in a corner formed by the ground and a vertical wall of a pen, stall or chute.

FIG. 1 depicts a portion of an animal sorting paddle 2 according to the prior art. The depicted portion of paddle 2 comprises the lower end 4 of a handle 6 and a conventionally shaped paddle head 8 attached to lower end 4 of handle 6. Paddle head 8 has a circular hub 10 at the rear of paddle head 8 for receiving and mounting handle 6. Paddle head 8 is rectangular and is typically about 6 to 7" wide and 14 to 16" long.

Paddle head 8 is blow molded out of plastic as a single piece. Paddle head 8 has a hollow interior. Hub 10 opens into the hollow interior of paddle head 8 and communicates with a tube shaped, central guideway 12 arranged along the centerline of paddle head 8. Lower end 4 of handle 6 is inserted through hub 10 a short distance into central guideway 12. A fastener 14, such as a bolt or set screw, connects lower end 4 of handle 6 to paddle head 8.

Noise producing members (not shown), such as BB's, are carried inside the hollow interior of paddle head 8. The noise producing members are inserted into paddle head 8 prior to the joining of lower end 4 of handle 6 to paddle head 8. When paddle 2 is shaken or moved, these noise producing members make a rattling sound. This sound helps control the movement of the animals on which paddle 2 is being used.

The tip 16 of paddle head 8 of the prior art paddle shown in FIG. 1 is shaped as a substantially flat or straight end. By this, it is meant that tip 16 of paddle head 8 is substantially straight over a majority of its length and is oriented substantially perpendicularly to the centerline of paddle head 8. When paddle 2 is used in a normal manner by a standing user, handle 6 will normally be held at an angle relative to the ground of anywhere from 30° or so to 60° or so. Accordingly, even if tip 16 of paddle head 8 is placed closely adjacent the ground or in contact with the ground and up against a wall 18 of a pen or chute as shown in FIG. 1, there is an underlying gap x between the flat tip of paddle head 8 and wall 18 of the pen. Small animals, such as piglets, will often slip through this gap x between the flat tip of paddle 2 and wall 18 to escape the blocking effect of paddle 2.

Figure 2:
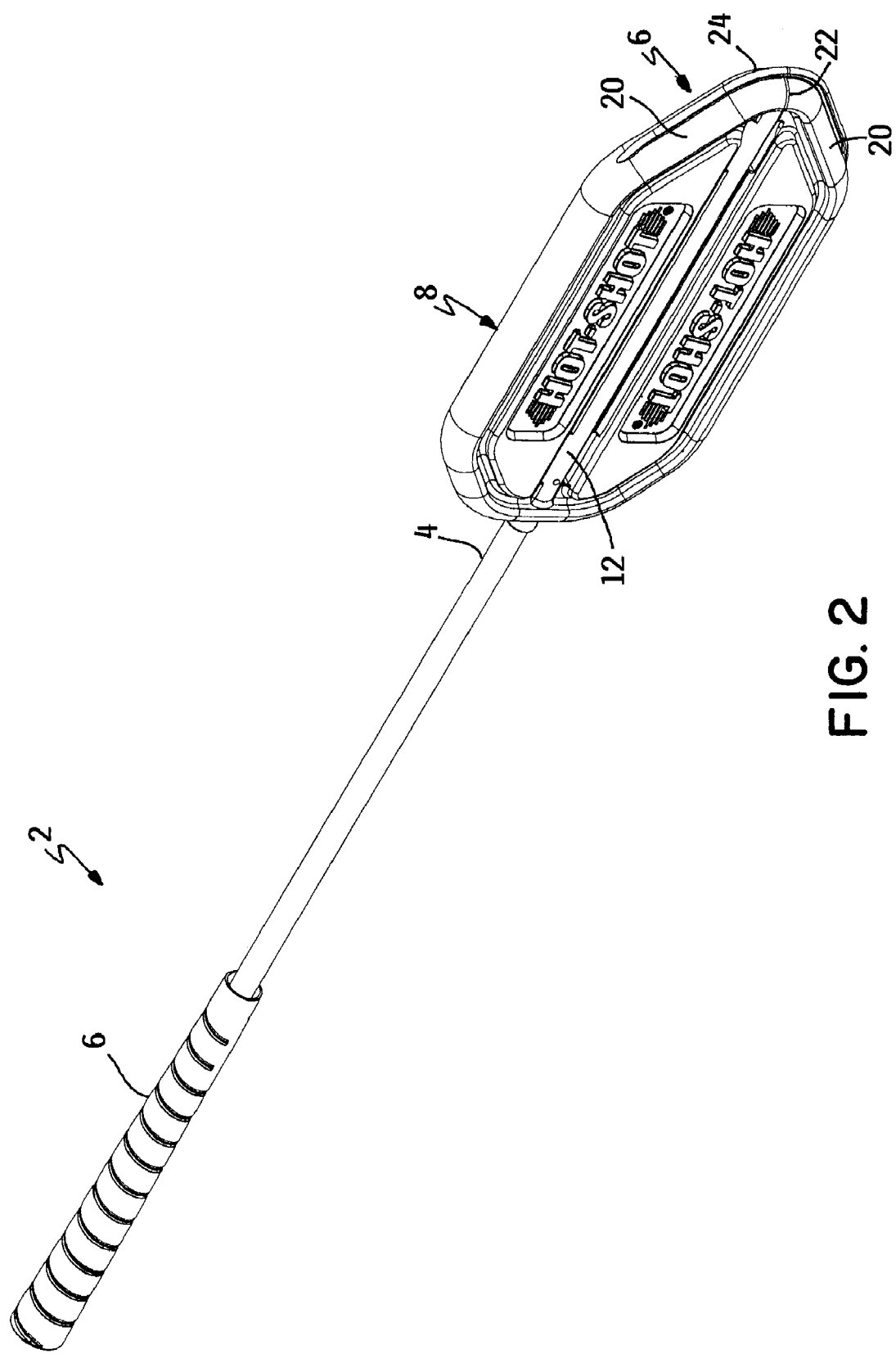
FIG. 2 is a perspective view of one embodiment of a sorting paddle according to this invention.
Figure 3:
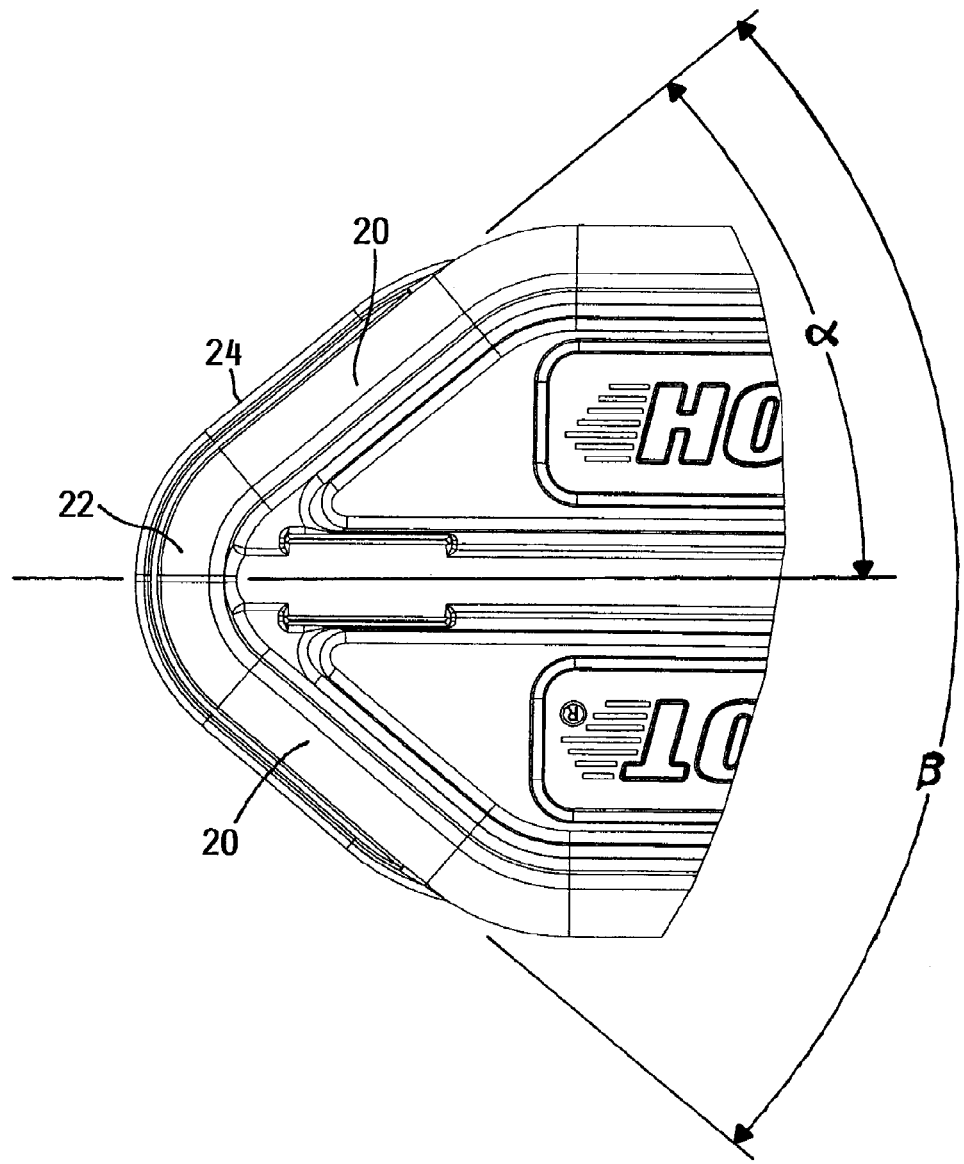
FIG. 3 is an enlarged plan view of the angled paddle head of the sorting paddle of FIG. 2, particularly illustrating an outwardly projecting wear rib thereon.
Figure 4:
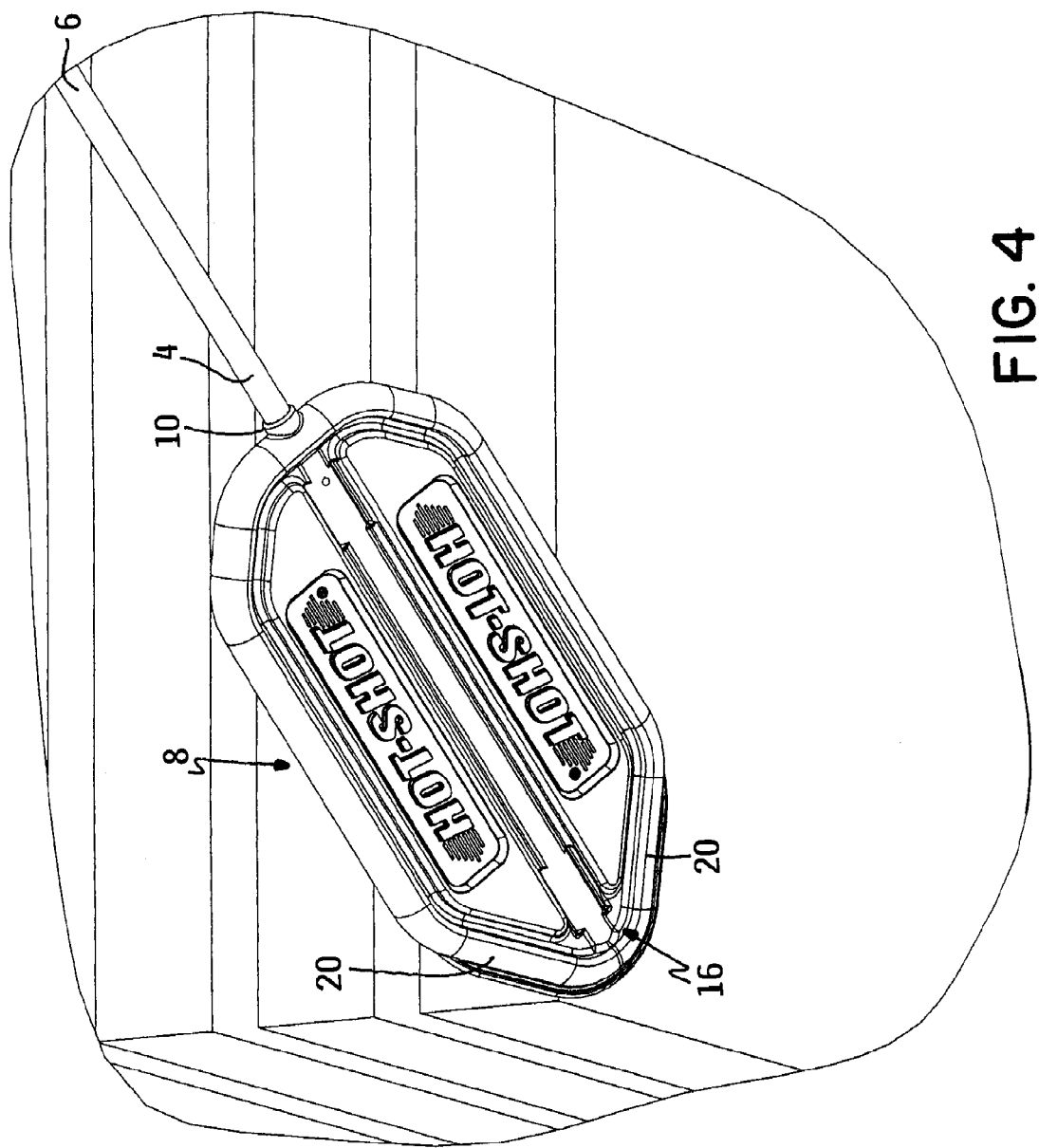
FIG. 4 is a perspective view similar to FIG. 1 of the sorting paddle shown in FIG. 2, particularly illustrating an angled tip on the paddle head adjacent the ground in a corner formed by the ground and a vertical wall of a pen, stall or chute.

FIGS. 2-4 illustrate an improved animal sorting paddle 2 according to this invention. The same reference numerals will be used in describing paddle 2 of this invention as were used for the same components when describing the prior art paddle 2 of FIG. 1. The basic construction of paddle head 8, of handle 6, and of how paddle head 8 attaches to handle 6 is the same as those components in the prior art paddle 2 of FIG. 1. The major difference between paddle 2 of this invention as shown in FIGS. 2-4 and the prior art paddle 2 of FIG. 1 is the shape and construction of tip 16 of paddle head 8.

As clearly shown in FIGS. 2-4, tip 16 of paddle head 8 now comprises an angled tip having a pointed, arrowhead shape rather than a flat or straight shape. Angled tip 16 comprises a pair of angled sides 20 that are connected together by a small rounded nose 22. Each side 20 extends rearwardly from rounded nose 22 and is placed at an angle α of approximately 30° to 45° relative to the centerline of paddle head 8. Thus, an angle β of approximately 60° to 90° is formed between angled sides 20 of tip 16 of paddle head 8. Preferably, the angle α is substantially or slightly less than 45° so that the angle β is substantially or slightly less than 90°.

When paddle 2 of this invention is now held by a standing user, the user can position paddle head 8 in the junction or corner formed by the ground and by wall 18 in a pen, stall or chute. This is shown in FIG. 4. In this position, one of the straight sides 20 of angled tip 16 lies substantially flat or parallel to the ground. The other straight side 20 of angled tip 16 lies relatively closely adjacent wall 18. This prevents any small animals from passing beneath angled tip 16 of paddle head 8 as gap x has been eliminated. Thus, paddle 2 of this invention does a better and more effective job of blocking and controlling the movement of animals, particularly young and/or small animals.

Because angled tip 16 of paddle head 8 will position the straight sides 20 closely to both the ground and the vertical walls 18 of a pen, stall or chute as paddle 2 of this invention is used, there is an increased chance of abrading and wearing away tip 16 of paddle head 8 along sides 20. If holes are worn in angled tip 16 of paddle head 8, the noise producing BB's contained inside paddle 2 could fall out and be lost. To prevent this, a wear rib 24 is integrally molded on angled tip 16 of paddle head 8 from the end of one straight side 20, around rounded nose 22, to the end of the other straight side 20.

Wear rib 24 projects outwardly from tip 16 of paddle head 8 to form a sacrificial wear portion of paddle head 8. Wear rib 24 will wear or abrade away and thus will protect sides 20 and nose 22 of angled tip 16 of paddle head 8 from undue wear.

Figure 5:
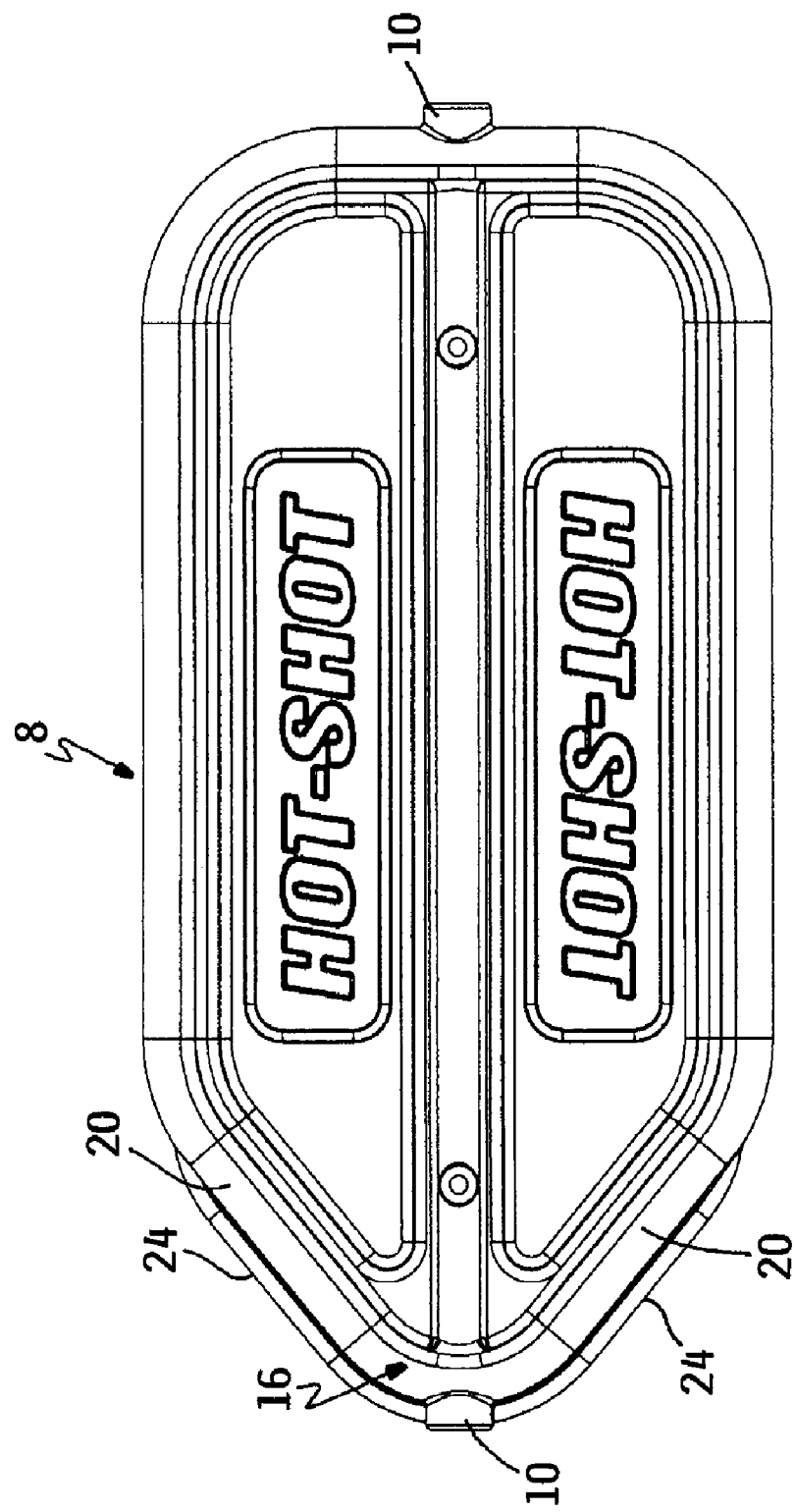
FIG. 5 is a top plan view of an alternative sorting paddle according to this invention, particularly illustrating a sorting paddle with an angled tip on one end and a relatively flat, straight tip on the other end.

FIG. 5 shows another paddle 2 according to this invention. In FIG. 5, the rear end of paddle head 8 has a flat or straight shape as in the prior art paddle of FIG. 1 and the front end of paddle head 8 is formed as an angled tip as described in FIGS. 2-4. Both the front and rear ends of paddle head 8 have handle attaching hubs 10. One hub 10 will be used at any one time to attach handle 6. The other unused hub 10 will be capped off by a cap or cover.

Paddle 2 of FIG. 5 is reversible on handle 6 to allow tip 16 of paddle head 8 to be either an angled tip or a flat tip. If handle 6 is attached to hub 10 along the rear end of paddle head 8, then angled tip 16 forms the front end of paddle head 8 to provide the advantages described above. However, if the user so desires, handle 6 can be attached to hub 10 along angled tip 16 such that the flat rear end of paddle head 8 becomes the flat tip of paddle head 8 and angled tip 16 now becomes the rear end of paddle head 8. This allows the user to selectively configure paddle 2 to have either a substantially flat or angled tip.

Various modifications of this invention will be apparent to those skilled in the art. Accordingly, the scope of this invention will be limited only by the appended claims.

We claim:

1. An animal sorting paddle for use in controlling the movement of animals, which comprises:
   (a) an elongated handle having a paddle head attached to a lower end thereof, the handle being long enough so that a standing user who is holding the handle at a downwardly inclined angle relative to the ground can position a tip of the paddle head adjacent the ground; and
   (b) wherein the tip of the paddle head is angled in the manner of a pointed arrowhead shape and comprises a nose and a pair of generally straight sides extending rearwardly from the nose with the straight sides being disposed at an angle relative to a centerline of the paddle head, the angle of the tip being chosen such that, while the standing user holds the handle at the downwardly inclined angle and places the nose of the paddle head substantially directly adjacent a corner between the ground and a substantially vertical wall of a pen, stall or chute, one side of the tip lies substantially adjacent the ground and the other side of the tip lies substantially adjacent the wall of the pen, stall or chute to substantially block the movement of small animals beneath the angled tip of the paddle head.

2. The paddle of claim 1, wherein the angle between each side of the tip of the paddle head and the centerline of the paddle is approximately the same.

3. The paddle of claim 1, wherein the angle between each side of the tip of the paddle head and the centerline of the paddle is approximately 45° or less.

4. The paddle of claim 1, wherein the angle between each side of the tip of the paddle head and the centerline of the paddle is in the range of approximately 30° to 45°.

5. The paddle of claim 1, wherein substantially the entire paddle head is hollow and contains noise producing members therewithin, and wherein the angled tip of the paddle head includes an outwardly extending wear rib on the exterior thereof to prevent holes from being worn or abraded in the angled tip.

6. The paddle of claim 5, wherein the paddle head and wear rib are integrally formed of a plastic material.

7. The paddle of claim 1, wherein the paddle head comprises a rear end opposite to the angled tip with the rear end of the paddle head being a substantially flat, straight end, and wherein the paddle head is reversibly mountable to the handle to allow either the angled tip or the rear end of the paddle head to form a free, distal tip of the paddle head.

8. The paddle of claim 1, wherein the nose of the tip is rounded.

9. An animal sorting paddle for use in controlling the movement of animals, which comprises:
   (a) an elongated handle having a paddle head attached to a lower end thereof, the handle being long enough so that a standing user who is holding the handle at an angle relative to the ground can position a tip of the paddle head adjacent the ground; and
   (b) wherein the tip of the paddle head is angled and comprises a pair of straight sides disposed at an angle relative to a centerline of the paddle head, the angle being chosen such that one side of the tip lies substantially adjacent the ground and the other side of the tip lies substantially adjacent the wall of a pen, stall or chute when the tip of the paddle head is placed adjacent a corner between the ground and a substantially vertical wall of a pen, stall or chute, whereby the movement of small animals beneath the angled tip of the paddle head is substantially blocked; and
   (c) wherein at least a portion of the angled tip of the paddle head is hollow and contains noise producing members within the hollow portion, and wherein the angled tip of the paddle head includes an outwardly extending wear rib on the exterior of the hollow portion of the angled tip to prevent holes from being worn or abraded in the hollow portion of the angled tip.

10. The paddle of claim 9, wherein the angled tip comprises the two straight sides and a rounded nose joining the two straight sides, wherein the hollow portion of the angled tip includes both the two straight sides and rounded nose.

11. The paddle of claim 10, wherein the wear rib extends from one end of one straight side of the angled tip, around the rounded nose of the tip, and to the end of the other straight side of the angled tip.

12. The paddle of claim 9, wherein at least the hollow portion of the angled tip and the wear rib are integrally molded out of plastic material.

13. An animal sorting paddle for use in controlling the movement of animals, which comprises:
   (a) an elongated handle having a paddle head attached to a lower end thereof, the handle being long enough so that a standing user can position the paddle head adjacent the ground;
   (b) wherein the paddle head has a front end and a rear end, and wherein the paddle head is reversibly installable on the handle such that either the front end or the rear end forms a tip of the paddle head, and wherein the front end and the rear end of the paddle head are shaped differently from one another to provide different animal movement controlling effects depending upon whether the front end or the rear end is used as the tip of the paddle head, and wherein at least one of the front and rear ends of the paddle head has a pointed arrowhead shape.

14. The paddle of claim 13, wherein the other of the front and rear ends of the paddle head has a substantially flat, straight shape.

15. The paddle of claim 13, wherein both the front and the rear ends of the paddle head contain a handle mounting hollow hub, and wherein only one hub at a time is used to couple the handle to the paddle head.

* * * * *